Sept. 13, 1938.　　　H. S. JANDUS　　　2,130,187
BRAKE LEVER
Filed July 29, 1937
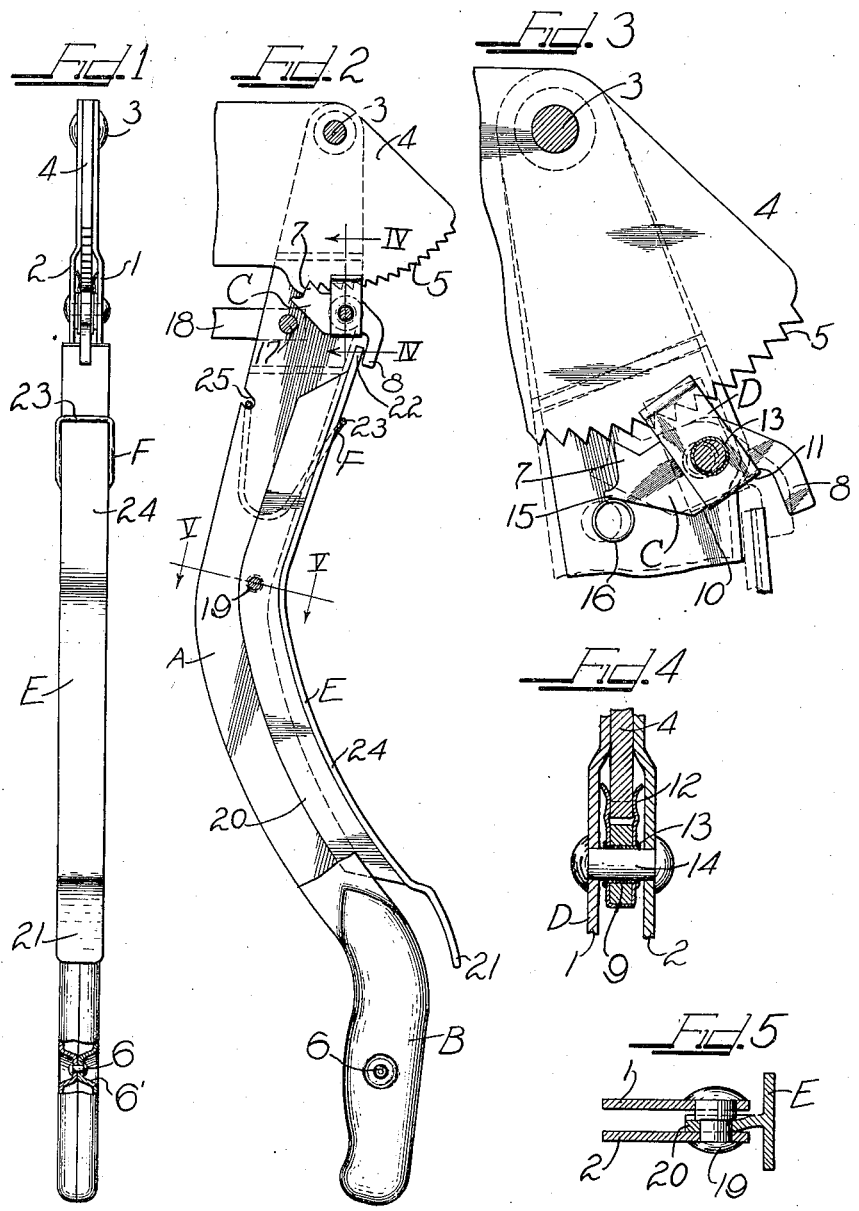
Inventor
HERBERT S. JANDUS
by Charles … Attys.

Patented Sept. 13, 1938

2,130,187

UNITED STATES PATENT OFFICE 2,130,187

BRAKE LEVER

Herbert S. Jandus, Detroit, Mich., assignor to Oakes Products Corporation, North Chicago, Ill., a corporation of Michigan Application July 29, 1937, Serial No. 156,264

3 Claims. (Cl. 74—537)

The present invention relates to a brake lever and will herein be illustrated and described as an emergency brake lever of the pawl and ratchet type, for automotive vehicles, and contemplates means for automatically preventing any clicking sound incidental to movement of the pawl over the ratchet whenever the lever is moved to set the brakes.

Many automobile drivers object to the clicking noise made by pawls of emergency brake levers when riding along the ratchet teeth as the levers are swung to set the brakes.

Although such emergency brake levers are provided with pawl release means, nevertheless the prevalent practice of drivers is to grasp the grip portions of the levers and pull the levers in direction to set the brakes, without actuating the pawl release means. Setting the brakes in this manner causes clicking noise as the pawls ride over the ratchet teeth. A simple pull, without hand squeeze, is the usual manner of setting emergency brakes of automotive vehicles, and emergency brake levers are constructed to function accordingly.

An object of the present invention is to provide a pawl and ratchet type emergency brake lever construction wherein a drag is imposed on the pawl of such character as to hold and rock the pawl out of the path of the ratchet teeth whenever the lever is swung in direction to set the brakes.

Another object of the present invention is to provide a pawl and ratchet type emergency brake lever construction wherein a drag is imposed on the pawl of such character as to automatically hold and rock the pawl into latched or clutched engagement with the ratchet when hand pull is released from the lever and tension of the brake mechanism tends to move the lever in counter direction.

A further object of the present invention is to provide, in a pawl and ratchet type emergency brake lever construction, means other than the pawl release means for automatically holding the pawl away from the ratchet teeth as the lever is swung in direction to apply or set the brakes.

A still further object of the present invention is to provide friction means for moving a brake lever pawl into latched engagement with its ratchet for latching the lever in adjusted position.

Another and still further object of the present invention is to provide friction means for moving the brake lever pawl out of the path of the ratchet teeth and so holding the pawl during movement of the brake lever to brake setting position of adjustment.

The invention has for a further object the provision of a novel pawl construction whereby a drag is imposed on the pawl as the lever is moved in brake setting direction to maintain the pawl out of clicking engagement with its cooperating ratchet.

The above, other, and further objects of the present invention will be apparent from the following description and accompanying drawing.

The accompanying drawing illustrates an embodiment of the present invention, and the views thereof are as follows:

Figure 1 is an edge elevational view of an automotive vehicle emergency brake lever of the dash type constructed in accordance with the principles of the present invention.

Figure 2 is a view partially in side elevation, with one of side members of the lever shaft broken away to show details of construction, of the illustrated form of the lever of the present invention, showing the parts with the pawl in latched engagement with its ratchet.

Figure 3 is an enlarged fragmental view, partially in elevation and partially in section, showing in full lines the pawl moved out of latching engagement with its ratchet, by the drag means of the present invention, and in dotted lines the latched engagement of the pawl with its ratchet.

Figure 4 is an enlarged vertical sectional view taken substantially in the plane indicated by line IV—IV of Figure 2.

Figure 5 is a transverse sectional view taken substantially in the plane indicated by line V—V of Figure 2.

The drawing will now be explained.

The form of lever herein illustrated includes a lever member A comprising two similarly shaped side portions 1 and 2 which are laterally spaced, and pivoted at one end, as at 3, to a support 4. The support 4 is fashioned from a plate of flat steel stock of suitable thickness and is provided with an arcuate margin in which are cut ratchet teeth 5, constituting the ratchet or one of the clutch members of the lever construction.

The opposite ends of the side wall members 1 and 2 are formed, by suitable stamping operations, to provide a grip portion which consists of similar members, each of which is stamped from one of the side wall portions, and secured together as by rivet 6 inserted through registering apertures arranged in depressed portions 6' of the grip portion ends of the side walls, as may be observed in Figures 1 and 2.

A pawl C, having at least one ratchet engaging tooth 7 and a tail 8, is provided with an aperture 9 for the pawl pivot. A portion of the pawl C is illustrated as having a straight edge portion 10, disposed on the margin thereof opposite to the tooth 7, and a spring clip D is formed of U-shape, in edge view, with its legs against the side surfaces of the pawl and its closed portion 11 against the straight margin 10 of the pawl. The ends of the legs extend beyond the ratchet engaging tooth portion 7 of the pawl, where the ends are inwardly bent or otherwise deflected as at 12. A tubular member or bushing 13 is entered in aperture 9 of the pawl and registering apertures in the legs of the clip D, with its ends spun over against the outer faces of the clip legs, to connect together the clip and the pawl and to constitute a bearing surface for the pawl pivot.

The pawl and clip are pivoted to the lever member A by a suitable pivot pin 14 which may constitute a rivet or bolt.

When the pawl C is pivoted to the lever, and the lever member secured to its support 4, the ends 12 of the clip D engage opposite surfaces of the support 4, inwardly of the ratchet teeth 5 thereon, with pinching action.

The pawl C is provided with a part 15, constituting, as illustrated, a foot, which is so positioned as to rest against a tubular member 16 as a stop when the pawl is rocked out of latching engagement with its ratchet.

The tubular member 16 is carried by the side members 1 and 2 of the lever member A and constitutes a bearing surface for a pivot pin 17 which connects a yoke 18 to the lever member. The brake mechanism is fastened, as by a cable, to the yoke 18 for operatively connecting the lever to the brake mechanism of the vehicle.

A pawl release member E, herein illustrated as of T section, is pivoted at 19 through its web 20 to the side portions 1 and 2 of the lever member A, in such manner as to rock about its pivot. Adjacent the grip portion B of the lever member A, the release member E is provided with a thumb or finger engaging portion 21 for manipulating the release member in a direction to disengage the pawl from latched engagement with the ratchet. The other end of the release member E is shown as having an extremity 22 which is arranged to act against the tail 8 of the pawl C to rock the pawl in a direction to move it out of latched or clutched engagement with the ratchet.

For normally maintaining the pawl release member in one position, which is the full line position shown in Figure 2, spring means are utilized.

The spring herein illustrated is fashioned from a wire F, which is U-shaped in end elevation and also in plan, with an intermediate part 23 arranged against the exterior of the flange 24 of the release member E and with the extremities of the wire inturned and engaging notches 25 formed in the margins of the side portions 1 and 2 of the lever member A, as illustrated in Figure 2. The normal tendency of the spring F is to maintain the manipulating portion 21 of the release member E spaced from the grip portion B of the lever member, so that on manipulation of the release member by movement of its portion 21 towards the grip portion B of the lever, the upper end thereof will be moved in clockwise direction against the tail 8 of the pawl, and thus unlatch the pawl from the ratchet.

The relationship of the parts shown in Figure 2 occurs when the lever is in "off" position and the tooth 7 of the pawl in latched engagement with one of the ratchet teeth.

To move the lever to set the brakes, the lever would be swung in counterclockwise direction by a pull on the grip portion B of the lever.

Because of the pinching or frictional engagement of the clip D with the surfaces of the ratchet or support member 4, when the lever is swung as stated, the tooth 7 of the pawl will be moved out of latched engagement with a ratchet tooth. The pawl remains in the full line position of Figure 3 throughout angular travel of the lever in counterclockwise direction, as viewed in the drawing, in a direction to set the brakes.

Assume that the lever A has been swung to the right, to the full line position of Figure 3, in which position sufficient pull has been applied to set the brakes, and the operator releases his grip on the grip portion B of the lever. The tension imposed on the lever by the pull of the brake rigging will tend to swing the lever in opposite direction, or clockwise direction, which tendency will tilt the pawl into dotted line position of Figure 3, that is into latched engagement with the ratchet of the support and thus hold the lever in set position. Tilting of the pawl is caused by the frictional engagement of the clip D with the side surfaces of the ratchet sector or part, imposing a drag on the pawl. The dotted lines of Figure 3 show the position to which the lever would be moved in retrograde direction due to pull of the brake mechanism when hand pressure is released on the grip portion B of the lever.

The provision of the foot 15 of the pawl against the tubular member 16 prevents this pawl from being tilted too far in counterclockwise direction, as viewed in Figures 2 and 3, when the lever member is swung in counterclockwise direction, as viewed in these figures.

Because of the fact that the clip D rocks the pawl out of latched engagement with the ratchet, when the lever is swung to set position, the tooth 7 of the pawl is away from the ratchet teeth 5, with the result that no clicking noise occurs as the lever is swung in a direction to set the brakes.

During the time that the pawl is out of latched engagement with the ratchet, the tail 8 of the pawl will be spaced away from the adjacent end of the pawl release member E, as shown in full lines in Figure 3.

It will be observed that the construction of the present invention is such that the pawl is rocked into and out of latched engagement with its ratchet by means imposing a drag on the pawl as the lever is swung in either direction.

The spring F is incapable of holding the pawl in latched engagement with the ratchet, as there is no positive connection between the pawl release member E and the pawl C.

It may be desirable to design the pawl so that it will be in dynamic balance about its center of rotation such that there will be no gravitational force acting on the pawl to urge it into engaged or disengaged position with respect to its ratchet.

The shapes of the ratchet teeth 5 and the cooperating tooth 7 of the pawl C are conventional. It is to be understood that any tooth contour may be used which will function in carrying out the features of the present invention.

The invention has been described herein more or less precisely as to details, yet it is to be understood that the invention is not limited thereby, as changes may be made in the arrangement and proportion of parts, and equivalents may be substituted, without departing from the spirit and scope of the invention.

The invention is claimed as follows:

1. A pawl construction for a brake lever including a pawl having a pivot aperture in it, a U-shaped clip arranged with its legs along the side surfaces of the pawl and apertured to register with the pawl aperture, and a tubular member within said apertures and having its ends spun over against the clip legs to connect said pawl and clip together and to provide a bearing surface for the pawl pivot.

2. A pawl construction for a brake lever including a pawl having a pivot aperture in it, a U-shaped clip arranged with its legs along the side surfaces of the pawl and apertured to register with the pawl aperture, and a tubular member within said apertures and having its ends spun over against the clip legs to connect said pawl and clip together and to provide a bearing surface for the pawl pivot, the ends of the clip legs projecting beyond the ratchet engaging tooth portion of the pawl to frictionally engage a ratchet sector.

3. In a brake lever construction, a lever member pivoted to swing, a ratchet, said lever member and ratchet being arranged for relative angular movement, a pawl pivoted to said lever member, spring fingers pivoted on said pawl pivot and swingable with said pawl and projecting beyond the ratchet engaging portion of the pawl to frictionally engage the ratchet to swing the pawl into or out of latched engagement with the ratchet in accordance with the swing of the lever member, and a release member pivoted to said lever member and engageable with said pawl to unlatch it regardless of the action of said fingers, the frictional engagement of said fingers with said ratchet constituting the sole means for moving the pawl into latched engagement with said ratchet.

HERBERT S. JANDUS.